No. 739,095. PATENTED SEPT. 15, 1903.
R. LEWITZ.
BICYCLE ALARM.
APPLICATION FILED APR. 1, 1903.
NO MODEL.

WITNESSES
John J. Kittle
Frederick Starke.

INVENTOR
Reinhold Lewitz,
by Goepel & Niles,
ATTORNEYS

No. 739,095. Patented September 15, 1903.

UNITED STATES PATENT OFFICE.

REINHOLD LEWITZ, OF NEW YORK, N. Y.

BICYCLE-ALARM.

SPECIFICATION forming part of Letters Patent No. 739,095, dated September 15, 1903.

Application filed April 1, 1903. Serial No. 150,604. (No model.)

*To all whom it may concern:*

Be it known that I, REINHOLD LEWITZ, a citizen of the Empire of Germany, residing in New York, borough of Manhattan, in the State of New York, have invented certain new and useful Improvements in Bicycle-Alarms, of which the following is a specification.

The object of this invention is to provide an alarm for indicating the approach of a bicycle or other similar wheeled vehicle, and for this purpose the invention consists of a bicycle-alarm comprising a hammer and means for operating said hammer against the bicycle-frame.

The invention consists, further, in certain details of construction and combinations of parts, which will be fully described hereinafter and finally pointed out in the claims.

Figure 1:
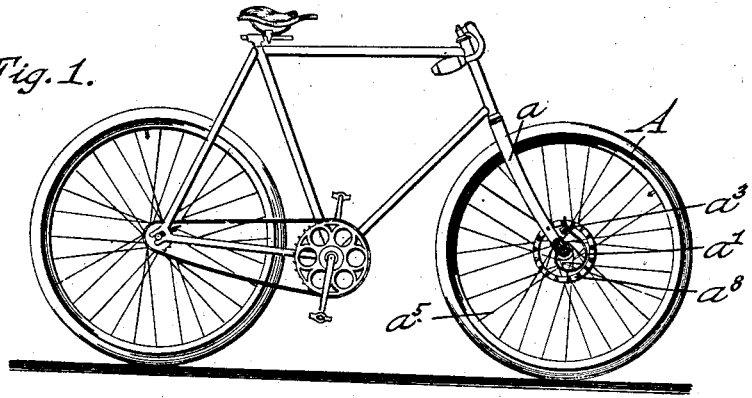
Figure 2:
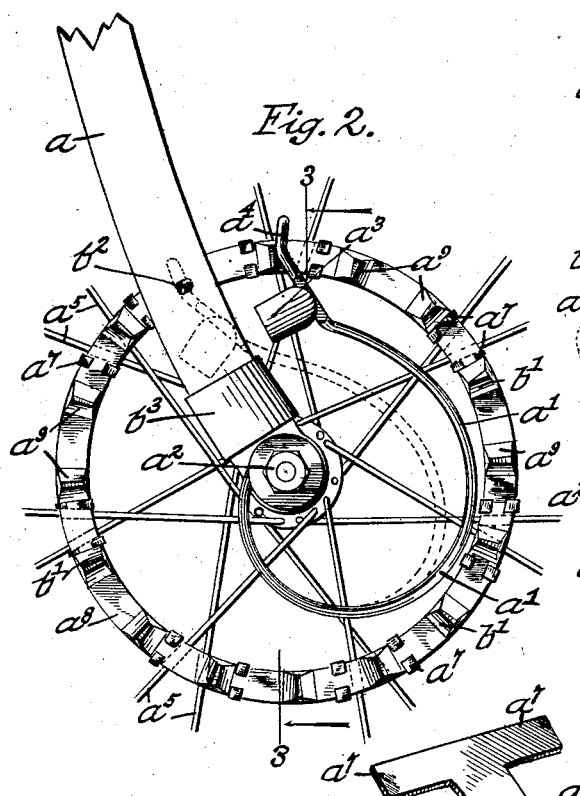
Figure 3:
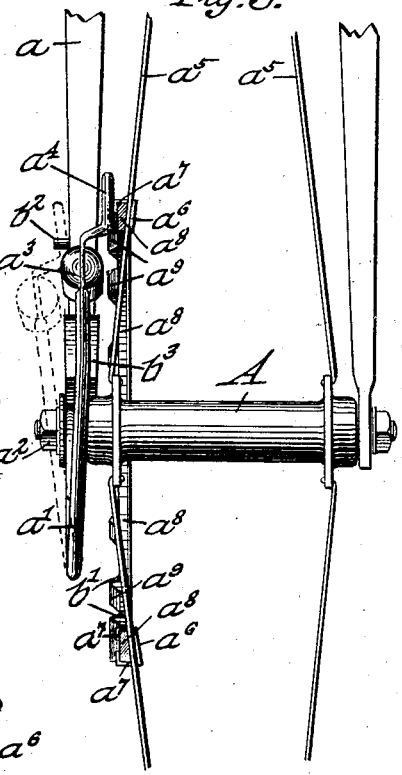
Figure 4:
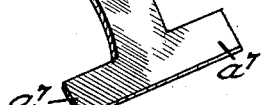

In the accompanying drawings, Figure 1 is a side elevation of a bicycle provided with my improved bicycle-alarm. Fig. 2 is a side elevation, on a larger scale, of a portion of a front fork side and the front wheel and showing in side elevation my improved bicycle-alarm applied for use. Fig. 3 is a front elevation, partly in section, on line 3 3, Fig. 2; and Fig. 4 is an enlarged perspective view of a clamp employed.

Similar letters of reference indicate corresponding parts.

Referring to the drawings, A indicates the front wheel of a bicycle or other similar wheeled vehicle. To one fork side $a$ of the front forks is connected a spring $a'$, preferably spiral in form. The same may be secured to the front fork in any suitable manner, as by being clamped at its lower end between the fork side $a$ and a washer at the inner side of the axle-nut $a^2$. Said spring extends from the points of connection and is provided adjacent the fork with a hammer $a^3$, of lead or other suitable material. At its outer end said spring extends beyond the hammer and forms a trip-finger $a^4$.

$a^5$ indicates spokes of the wheel A. To said spokes is clamped by any suitable means, such as clamps composed of a body portion $a^6$ and wings $a^7$, a trip-ring or annulus $a^8$, provided at suitable points in its circumference with teeth $a^9$. The finger $a^4$ is located in the path of said teeth $a^9$. The spring $a'$ is adapted to yield not only in direction circumferentially of said ring $a^8$ and of the bicycle-wheel A, but is also adapted to yield laterally of said wheel. The spaces between the successive teeth are sufficiently large as to permit the hammer to strike the fork $a$ after release of the finger $a^4$ before said finger is again engaged by the succeeding tooth of the trip-ring $a^8$. This distance is dependent upon the inertia of the hammer, the strength of the spring, the normal distance of the hammer from the fork, and the formation of the teeth $a^9$. These various parts are so constructed that the hammer is permitted to strike the fork before being engaged by a following tooth, notwithstanding a high speed of the bicycle. Sound is produced by the blow of the hammer upon the fork, following the escape of the finger $a^4$ from a tooth $a^9$. The spring $a'$ is adjustable relatively to said fork side $a$. It may be set in any desired position—that is to say, with the hammer normally in contact with the fork $a$ or with the hammer normally removed at any desired distance therefrom. The strength of the sound produced may thereby be adjusted and controlled. The finger $a^4$ escapes from each tooth $a^9$ when the power of the spring to return circumferentially to its original position exceeds the resistance of the spring itself to lateral movement and overcomes the friction of the finger upon the tooth $a^9$. By proper formation of these teeth the escape of the finger $a^4$ may be regulated. When the teeth are arranged with their engaging faces $b'$ at a considerable angle—say, forty-five degrees—to the plane of the spring $a'$, the spring will be released at a given point. If now this angle be increased into the position indicated in dotted lines in Fig. 3—say to sixty degrees—the finger $a^4$ will not be so promptly released. The hammer will, therefore, be drawn farther from the fork and the return will be more forcible. On the other hand, if the angle be decreased the release will occur earlier, and the blow and resulting warning-sound will be less perceptible.

A rest $b^2$ projects from the fork side $a$ at the outer side of the same. Said rest is in such location as to be readily engaged by the finger $a^4$ when the spring, finger, and hammer are moved outwardly—that is to say, laterally in outward direction and backward. By this operation the finger is removed from the path of the teeth $a^9$. It is retained out of engagement by said rest and the fork side. When it is desired to set the alarm again in action, it is merely necessary to release the finger from the rest $b^2$. The spring $a'$ immediately returns the parts into normal position. In order that this return may be conveniently accomplished by the rider, the finger-engaging rear portion of the rest is made plane, and the finger $a^4$ is so directed as to extend at a slight angle outwardly from the fork side $a$ when in engagement with the rest-pin $b^2$, thereby forming a release, Fig. 3, whereby the rider may with his foot and without dismounting disengage the finger from the pin.

A cushion $b^3$, of leather, felt, india-rubber, heavy cloth, or other suitable cushioning material, is inserted between the hammer and the fork side $a$ when it is desired to reduce the sound of the alarm. Said cushion is of tubular form and fits closely the fork side $a$, whereby to be retained by friction in position thereon. Said sleeve is of such length as when located at the lower end of the fork not to project within the path of the hammer $a^3$. When it is desired to deaden or reduce the alarm, the sleeve is moved upwardly on the fork side into the path of the hammer. The cushion is flexible, tubular, and rotatable upon the fork, whereby a new surface may be presented to the hammer when a single portion is outworn.

Having thus described my invention, I claim as new and desire to secure by Letters Patent—

1. A vehicle-alarm, consisting of a hammer mounted to strike the vehicle-frame, and means connected with a wheel of said vehicle for operating said hammer, substantially as set forth.

2. A vehicle-alarm, consisting of a spring-actuated hammer mounted to strike the vehicle-frame, and means connected with a wheel of said vehicle for tripping said hammer, substantially as set forth.

3. A vehicle-alarm, consisting of a spring-actuated hammer movable circumferentially and laterally of a wheel of said vehicle and mounted to strike the vehicle-frame, and a series of teeth adapted to engage and release said hammer, substantially as set forth.

4. A vehicle-alarm, consisting of a hammer spring-actuated circumferentially toward the vehicle-frame, means for operating said hammer, and means for circumferentially adjusting said hammer, substantially as set forth.

5. A vehicle-alarm, consisting of a hammer mounted to strike the vehicle-frame, hammer-tripping means on a wheel of said vehicle, and means for retaining said hammer out of engagement with said tripping means, substantially as set forth.

6. A vehicle-alarm, consisting of a hammer mounted to strike the vehicle-frame and spring-actuated normally into operative position, and means for retaining said hammer in laterally-moved inoperative position, substantially as set forth.

7. A vehicle-alarm, consisting of a hammer mounted to strike the vehicle-frame, means for operating said hammer, and a cushioning device movable into and out of the path of said hammer, substantially as set forth.

8. A vehicle-alarm, consisting of a hammer mounted to strike the vehicle-frame, means for operating said hammer, and a cushioning device shiftable on said frame into and out of the path of said hammer, substantially as set forth.

9. A vehicle-alarm, consisting of a hammer mounted to strike the vehicle-frame, means for operating said hammer, and a rotatable cushioning device movable into and out of the path of said hammer, substantially as set forth.

10. A vehicle-alarm, consisting of a hammer mounted to strike the vehicle-frame, means for operating said hammer, and a flexible tubular cushioning device rotatable on said frame and movable thereon into and out of the path of said hammer, substantially as set forth.

11. A vehicle-alarm, consisting of a spring-actuated hammer mounted to strike the vehicle-frame, means for operating said hammer, means for retaining the same inoperative, and a foot-engageable release for said hammer, substantially as set forth.

12. A vehicle-alarm, consisting of a spring-actuated hammer mounted to strike the vehicle-frame, means for operating said hammer, means for releasably retaining the same in laterally-moved inoperative position, and a foot-engageable release connected with said hammer, substantially as set forth.

13. A vehicle-alarm, consisting of a spring applied at its inner end to the vehicle-frame, a hammer carried by said spring adjacent the vehicle-frame, and a series of laterally-projecting teeth adapted to engage and release said hammer, substantially as set forth.

14. A vehicle-alarm, consisting of a spring applied at its inner end to the vehicle-frame, a hammer carried by said spring adjacent the vehicle-frame, and a trip-ring connected with a wheel of said vehicle, and provided with a series of laterally-projecting teeth adapted to engage and release said hammer, substantially as set forth.

15. A vehicle-alarm, consisting of a spring applied at its inner end to the vehicle-frame, a hammer carried by said spring adjacent said vehicle-frame, and a trip-ring connected with a wheel of said vehicle, and provided with a series of laterally-projecting teeth provided with inclined faces adapted to engage and release said hammer, substantially as set forth.

In testimony that I claim the foregoing as my invention I have signed my name in presence of two subscribing witnesses.

REINHOLD LEWITZ.

Witnesses:
 HENRY J. SUHRBIER,
 FRANK E. BOYCE.